United States Patent
Stark

[11] Patent Number: 5,845,762
[45] Date of Patent: Dec. 8, 1998

[54] AUGER BOOT

[76] Inventor: Larry Stark, Box 415, Mossbank, Canada, S0H 3G0

[21] Appl. No.: 654,201

[22] Filed: May 28, 1996

[30] Foreign Application Priority Data

Jan. 19, 1996 [CA] Canada ................................. 2167665

[51] Int. Cl.⁶ .................................................. B65G 65/34
[52] U.S. Cl. ...................... 198/550.1; 198/671; 198/311
[58] Field of Search ..................................... 198/311, 671, 198/550.1, 548

[56] References Cited

U.S. PATENT DOCUMENTS

| 2,422,722 | 6/1947 | Fielitz | 198/671 |
| 3,035,682 | 5/1962 | Ferch . | |
| 3,163,280 | 12/1964 | Haugland . | |
| 3,203,532 | 8/1965 | Mimnaugh et al. . | |
| 3,729,087 | 4/1973 | Bruns . | |
| 4,220,434 | 9/1980 | Letzig | 198/671 |
| 4,266,902 | 5/1981 | Forsberg | 198/671 |
| 4,492,302 | 1/1985 | Svens | 198/671 |
| 4,610,344 | 9/1986 | Eastman . | |
| 4,963,066 | 10/1990 | Boppart | 198/671 |
| 5,404,993 | 4/1995 | Scarrow . | |

Primary Examiner—Joseph E. Valenza
Attorney, Agent, or Firm—Murray E. Thrift; Adrian D. Battison

[57] ABSTRACT

The present invention provides an auger boot for use with a grain auger particularly of the type for use when manually delivering grain to the inlet of a grain auger. The auger boot delivers grain to the inlet of a grain auger, can be easily placed in position and be removed when not needed. Use of the auger boot does not require modification of the grain auger. The auger boot is well suited for use when manually loading grain into the auger, and is well suited for use inside of grain bins. The auger boot comprises a grain accumulator and a grain hopper. The grain accumulator is adapted to slide over and to surround the inlet end of the grain auger and a grain hopper is attached to the grain accumulator for delivering grain to the grain accumulator.

15 Claims, 4 Drawing Sheets

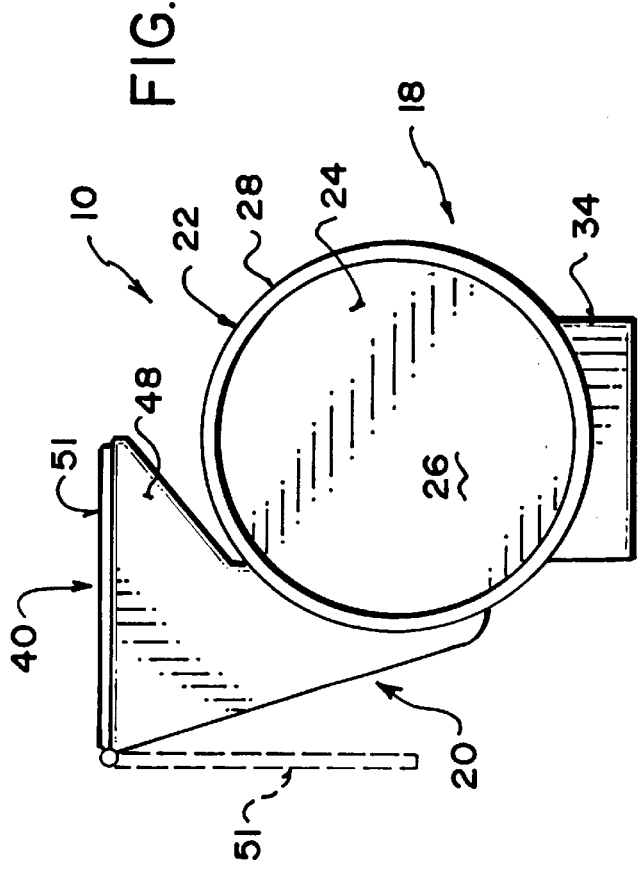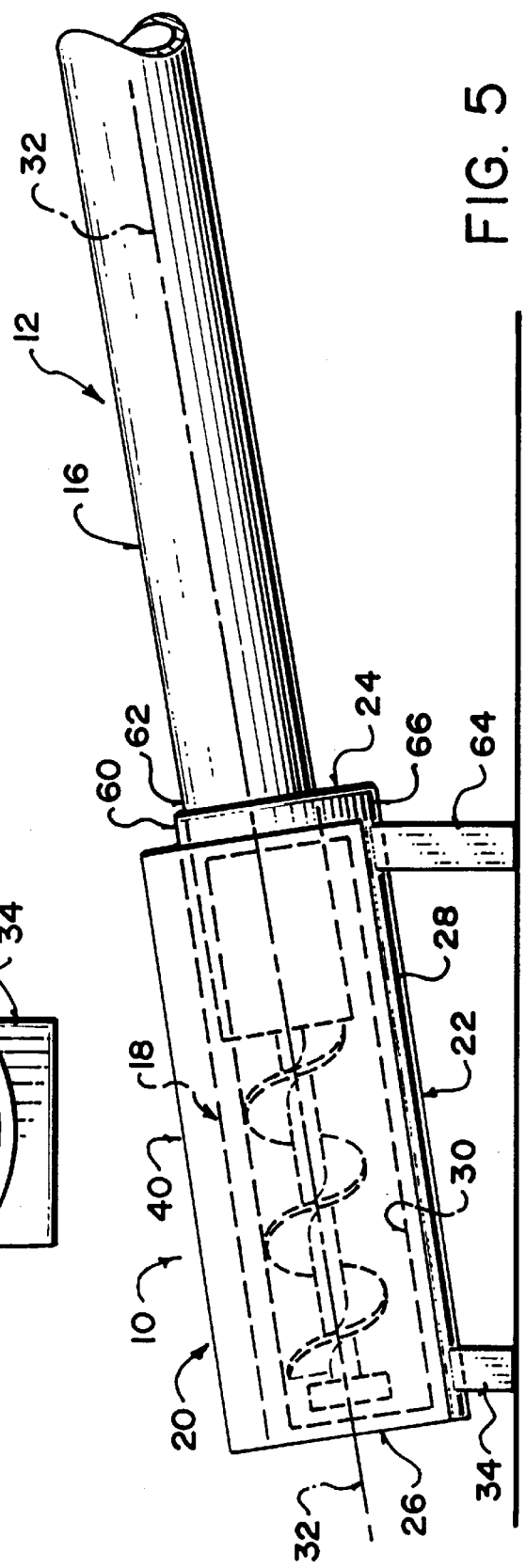

AUGER BOOT

FIELD OF THE INVENTION

The present invention provides an auger boot for use with a grain auger particularly of the type for use when manually delivering grain to the inlet of a grain auger.

BACKGROUND

Grain augers are commonly used for unloading grain into a grain bin. Presently cleaning up the last quantity of grain is usually done by sweeping and shoveling the grain into the inlet of an auger. This is generally inefficient with much of the grain dumped into the auger inlet ending up back on the ground.

To assist with this final clean-up it has been proposed to mount a small hopper on the auger. This hopper is fixed to the auger casing, and requires cutting a hole in the casing of the auger inlet. Mounting this type of hopper can be a time consuming procedure and requires permanently altering the auger. As well, when shoveling grain into this hopper, the grain must be lifted well above the casing, at a position spaced up the auger from the inlet.

Various other hoppers are known for use with grain augers. Most of these hoppers are large and attach semi-permanently or permanently to the grain auger and are not well suited for use in grain bins.

SUMMARY

According to a first aspect of the present invention there is provided an auger boot for use with a grain auger having an inlet end and a casing, said auger boot comprising: a grain accumulator being adapted to slide over and to surround the inlet end of the grain auger, said grain accumulator having an outer wall, a closed bottom end, an open top end for receiving the inlet end of the grain auger therethrough, and an opening in the outer wall for receiving grain therethrough; and a grain hopper attached to the grain accumulator having an inlet for receiving grain and an outlet arranged to cooperate with the opening in the outer wall of the grain accumulator to deliver grain to the grain accumulator.

The opening in the outer wall of the grain accumulator is preferably located laterally of the grain auger inlet. The grain accumulator is sized and arranged to prevent grain from being thrown out of the accumulator by operation of the auger, and is free from attachment to the grain auger.

The hopper and accumulator are preferably made of a single piece of light weight plastics material.

According to a second aspect of the invention an auger boot for use with a grain auger having an inlet end and a casing, said auger boot comprising: a grain accumulator comprising a tubular member being adapted to slide over and to surround the inlet end of the grain auger, said tubular member having an outer wall, a closed bottom end, an open top end for receiving the inlet end of the grain auger therethrough, and an opening in the outer wall for receiving grain therethrough; a grain hopper attached to the grain accumulator having an inlet for receiving grain and an outlet arranged to cooperate with the opening in the outer wall of the grain accumulator to deliver grain to the grain accumulator; and a foot arranged adjacent the bottom end of the grain accumulator for supporting the grain accumulator.

According to a another aspect of the invention there is provided a method of conveying granular material from a first location to a second location comprising: providing an auger conveyor having an inlet end; providing an auger boot having a granular material accumulator for delivering granular material to the auger inlet end, and a hopper for delivering granular material to the accumulator; slideably positioning the accumulator over the inlet end of the auger conveyor such that the accumulator surrounds the inlet end of the grain auger; supplying granular material to the hopper; and conveying the granular material via the auger from the first location to the second location.

The method may also include: removing the auger boot from around the auger inlet end; transporting the auger boot to the second location; dumping at the second location any residual granular material left in the accumulator by the auger.

BRIEF DESCRIPTION OF THE DRAWINGS

In the accompanying drawings, which illustrate an exemplary embodiment of the present invention:

FIG. 5 is a side view of the grain auger and of an alternative arrangement of the auger boot; and FIG. 6 is a view showing the open top end of an alternative arrangement of the auger boot and the hopper lid in various positions.

DETAILED DESCRIPTION

Figure 1:
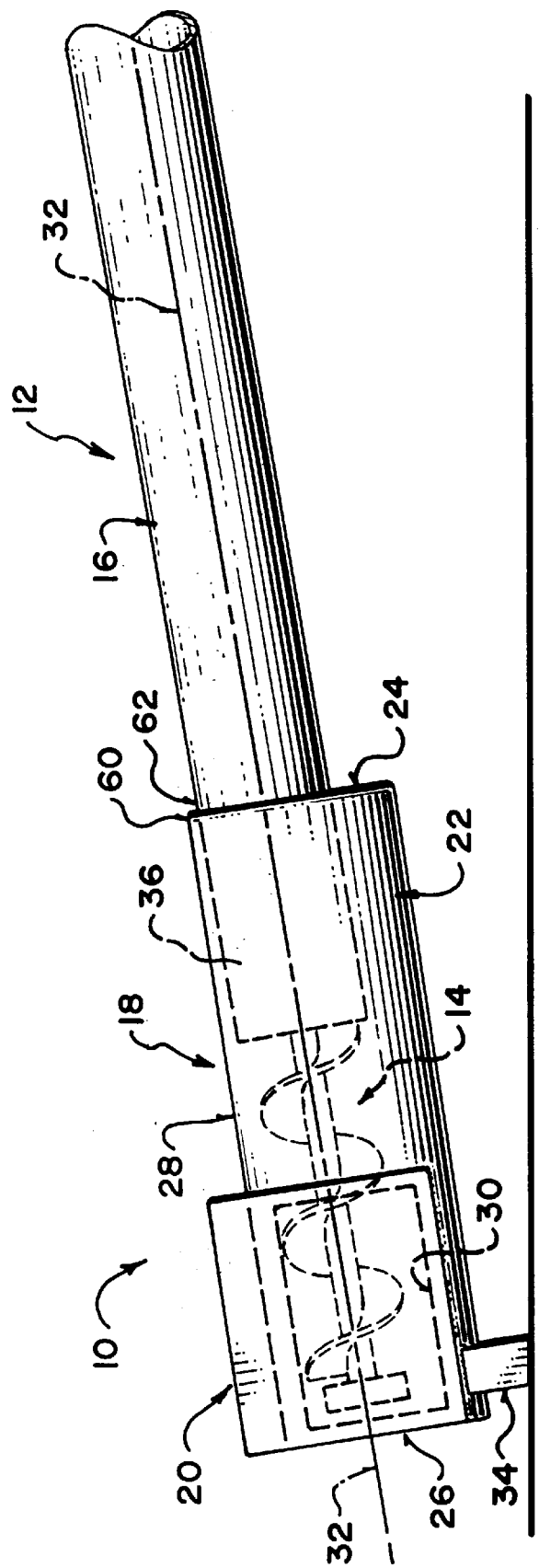
FIG. 1 is a side view of the grain auger and the auger boot.
Figure 2:
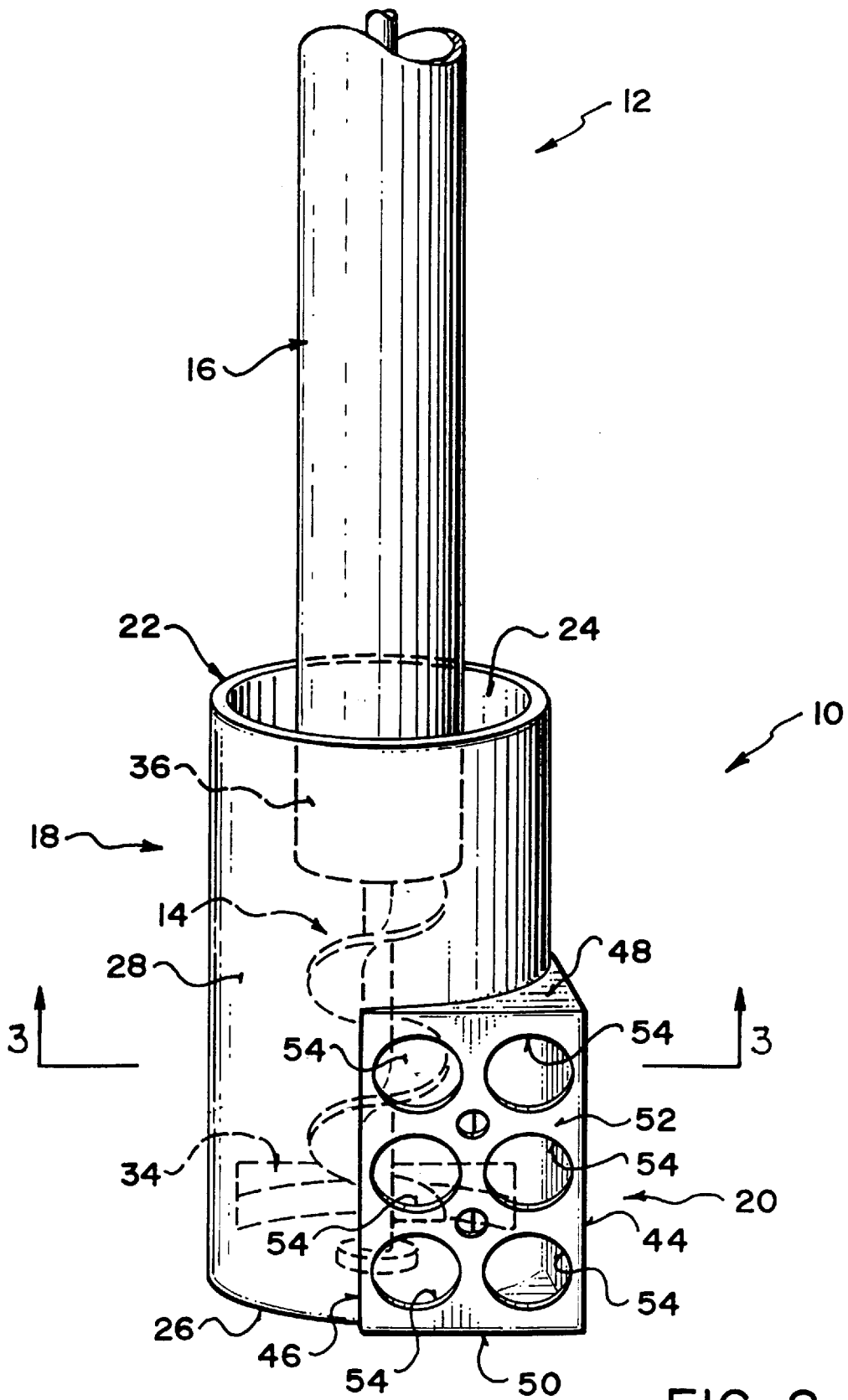
FIG. 2 is a top view of the auger boot in place on the grain auger.
Figure 3:
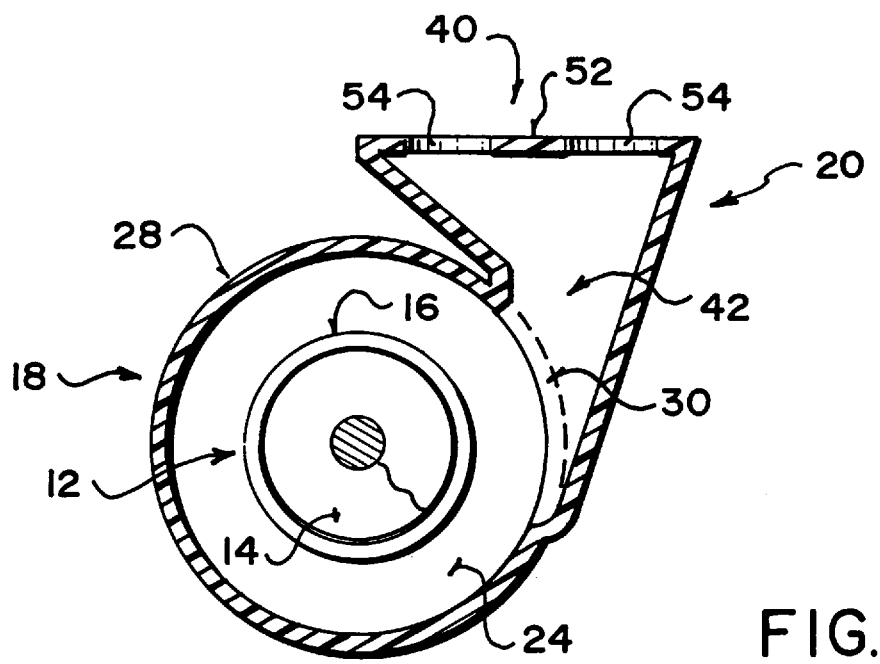
FIG. 3 is a cross sectional view of the auger boot through A—A.
Figure 4:
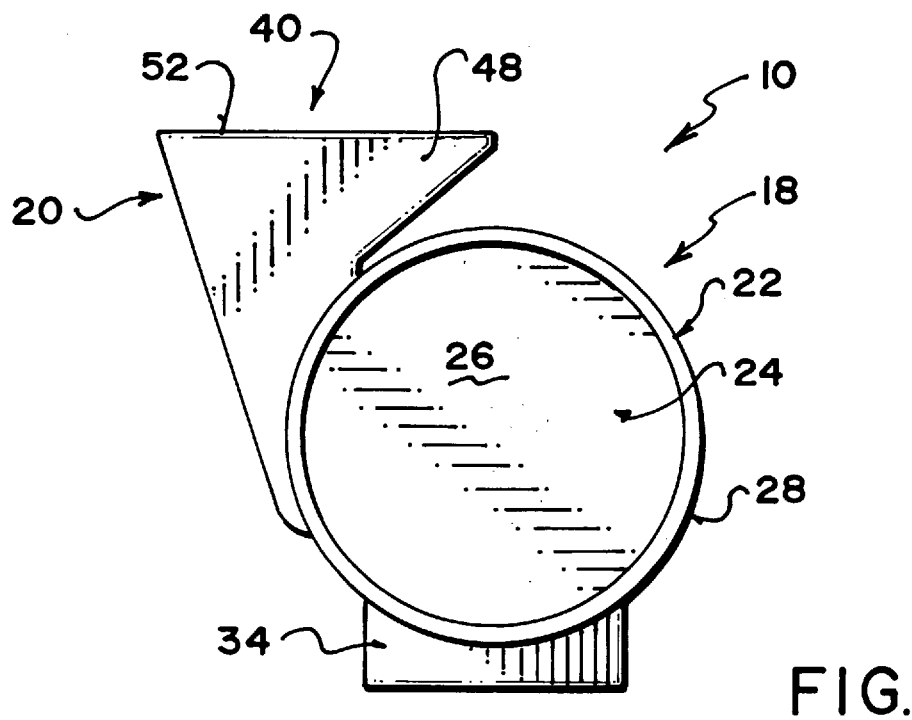
FIG. 4 is a view showing the open top end of the auger boot.

Referring to FIGS. 1 and 2 the auger boot is shown generally at 10. The auger boot 10 is for use with a grain auger 12 having an inlet end 14 and an outer casing 16. The auger boot 10 comprises a grain accumulator 18 and a grain hopper 20.

The grain accumulator 18 includes a cylindrical housing 22 with an open top end 24, a closed bottom end 26, and an outer wall 28. The outer wall 28 includes an opening 30 for receiving grain from the hopper 20. The opening 30 is preferably located in the outer wall 28 such that when in use the opening 30 lies to one side of the auger inlet and is spaced laterally from a longitudinal axis 32 of the grain auger 12. This arrangement results in grain being fed into the accumulator 18 to one side of the auger inlet 14. This limits the amount of grain thrown up and back out of the hopper.

The grain accumulator 18 includes a foot 34 arranged adjacent the bottom end 26 of the accumulator 18. When in use the foot 34 supports the bottom end 26 of the auger 12.

The accumulator 18 is sized and arranged to extend longitudinally along a bottom portion 36 of the length of the grain auger 12 when it is in position for use, and surrounds this portion of the auger. The entire inlet 14 of the auger is contained within the accumulator 18 thereby allowing grain to be fed into the auger 12 and preventing grain from being throw out of the accumulator 18 by operation of the auger 12.

The auger boot 10 is positioned for use by slipping the inlet end 14 of the grain auger 12 into the accumulator 18 through the opening 24 at the top of the accumulator 18. No attachments are needed to hold the auger boot 10 in place, or to fix it to the grain auger 12. The auger boot 10 is therefore easily and quickly placed in position for use and removed when no longer needed.

The grain hopper 20 delivers grain to the grain accumulator 18. The grain hopper 20 has an inlet 40 for receiving grain and an outlet 42 attached to the grain accumulator 18 arranged to cooperate with the opening 30 in the outer wall 28 of the grain accumulator 18. The grain hopper 20 delivers grain being manually fed into the hopper inlet 40 to the grain accumulator 18 and thereby to the auger inlet 14.

The hopper inlet 40 is larger than the hopper outlet 42 and comprises side walls 44, 46, 48 and 50 angling inwards and a plate member 52 extending between top edges of the side walls 44, 46, 48 and 50. The plate member 52 has a plurality of holes 54 for receiving grain therethrough and slopes slightly downwards and inwards from each of its side edges. The slope of the plate member 52 directs grain into the plurality of holes 54 in the plate. Each one of the plurality of holes 54 is preferably circular in shape.

The side walls 44, 46, 48 and 50 of the hopper comprise a first pair of parallel side walls 44 and 46 arranged parallel to a longitudinal axis 32 of the grain accumulator 18. The first pair of parallel side walls 44 and 46 extend downwards and inwards from the inlet 40 of the hopper 20 to the outlet 42 of the hopper 20. The top edge of a first one 44 of the first pair of parallel side walls is arranged parallel to the longitudinal axis 32 of the grain accumulator 18 and lies to one side of the outer wall 28 of the grain accumulator 18. The top edge of a second one 46 of the first pair of parallel side walls is arranged parallel to a longitudinal axis 32 of the grain accumulator and lies above a portion of the housing 22 of the grain accumulator 18.

The hopper 20 includes a second pair of parallel side walls 48 and 50 which are arranged perpendicular to the longitudinal axis 32 of the grain accumulator 18. Each one of the second pair of parallel side walls 48 and 50 extends between the first pair of parallel side walls 44 and 46. The second pair of parallel side walls 48 and 50 extend downwards from the inlet 40 to the outlet 42.

The hopper 20 includes a lid 51 arranged to extend over at least a portion of the hopper inlet 40 (see FIG. 6). The lid 51 is movable between a closed position covering the portion of the hopper inlet 40, to an open position away from the portion of the hopper inlet 40.

The auger boot 10 is positioned for use by sliding the inlet end 14 of the grain auger 12 into the accumulator 18 through the opening 24 at the top of the accumulator 18. When in place the foot 34 of the auger boot 10 lies in contact with the ground or other supporting surface and supports the bottom end 26 of the auger 12 and the auger boot 10. The inside top surface 60 of the outer wall 28 of the grain accumulator 18 rests upon a top surface 62 of the auger casing 16 supporting the top end 24 of the auger boot 10. The accumulator housing 22 extends longitudinally along the bottom portion 36 of the length of the grain auger 12 upwards to a point such that the entire inlet 14 of the auger 12 is contained within the accumulator housing 18.

Grain is shoveled or otherwise delivered to the inlet 40 of the hopper 20 which in turn supplies grain to the accumulator 18 via the opening 30 in the outer wall 28 of the grain accumulator housing 22. The grain enters into the accumulator 18 from the side and is then picked up by the auger 12 and conveyed to the desired location When all of the grain has been shoveled into the hopper 20 and the auger 12 has transported all of the grain it can pick up within the accumulator 18 the auger boot 10 is removed from the bottom of the auger 12. The auger boot 10 can then be carried by hand, with any residual grain still inside of it, to the location of the augered grain and be dumped in with the augered grain.

The auger boot 10 may be made of any appropriate material however a single piece of light weight plastics material manufactured using a rotational molding technique is preferred.

In alternative embodiments the grain accumulator 18 may also include a second foot 64 arranged adjacent a top end 66 of the grain accumulator 18 for supporting the top end 66 of the grain accumulator 18, and/or the hopper 20 may be enlarged to accept larger quantities of grain (see FIG. 5).

While one embodiment of the present invention has been described in the foregoing, it is to be understood that other embodiments are possible within the scope of the invention. The invention is to be considered limited solely by the scope of the appended claims.

I claim:

1. In combination, an auger boot and a grain auger having an inlet end and a tubular casing, said auger boot comprising:

a grain accumulator comprising a tubular member larger than the auger casing and having an outer wall, a closed bottom end, a top end opening in the top end, larger than the casing, and an opening in the outer wall for receiving grain therethrough, the accumulator extending over the auger inlet end and along the auger casing, with the casing extending through the opening in the top end of the accumulator; and a grain hopper attached to the grain accumulator, the hopper having an inlet for receiving grain and an outlet arranged to cooperate with the opening in the outer wall of the grain accumulator to deliver grain to the grain accumulators, and wherein the auger boot is unattached to the auger.

2. A combination in accordance with claim 1 wherein the grain accumulator is cylindrical in shape.

3. A combination in accordance with claim 1 wherein the opening in the accumulator outer wall is located in a side of the tubular member spaced laterally from the grain auger inlet.

4. An auger boot for use with a grain auger having an inlet end and a casing, said auger boot comprising:

a grain accumulator adapted to slide over and to surround the inlet end of the grain auger, said grain accumulator having an outer wall, a closed bottom end, an open top end for receiving the inlet end of the grain auger therethrough, an opening in the outer wall for receiving grain therethrough, an a foot arranged adjacent the bottom end of the grain accumulator for supporting the bottom end, and wherein an inside top surface of the outer wall of the grain accumulator rests upon a top surface of the auger casing supporting the top end of the grain accumulator; and a grain hopper attached to the grain accumulator having an inlet for receiving grain and an outlet arranged to cooperate with the opening in the outer wall of the grain accumulator to deliver grain to the grain accumulator.

5. An auger boot for use with a grain auger having an inlet end and a casing, said auger boot comprising:

a grain accumulator being adapted to slide over and to surround the inlet end of the grain auger said grain accumulator having an outer wall, a closed bottom end, an open top end for receiving the inlet end of the grain auger therethrough, and an opening in the outer wall for receiving grain therethrough; and a grain hopper attached to the grain accumulator having an inlet for receiving grain and an outlet arranged to cooperate with the opening in the outer wall of the grain accumulator to deliver grain to the grain accumulator, the hopper inlet having a plate member extending across the inlet and sloping downwards and inwards from each edge thereof, and a plurality of holes through the plate member for receiving grain therethrough.

6. An auger boot in accordance with claim 5 wherein each one of the plurality of holes is substantially circular in shape.

7. A combination in accordance with claim 1 wherein the inlet of the hopper has a first edge arranged parallel to a longitudinal axis of the grain accumulator spaced laterally from the grain accumulator, and wherein the inlet of the hopper has a second edge arranged parallel to a longitudinal axis of the grain accumulator and lying above a portion of the grain accumulator.

8. An auger boot in accordance with claim 1 wherein the hopper includes a pair of parallel side walls arranged perpendicular to a longitudinal axis of the grain accumulator, said side walls extending downwards from the inlet to the outlet.

9. A combination in accordance with claim 1 wherein the hopper includes a pair of side walls arranged parallel to a longitudinal axis of the grain accumulator, said side walls converging downwards from the inlet to the outlet of the hopper.

10. A combination in accordance with claim 1 wherein the hopper and accumulator are of a single piece of material.

11. A combination in accordance with claim 1 wherein the hopper and accumulator are of a light weight material.

12. A combination in accordance with claim 1 wherein the hopper and accumulator are of plastics material.

13. A combination in accordance with claim 1 wherein the hopper includes a lid arranged to extend over at least a portion of the hopper inlet, said lid being movable between a closed position covering said portion of the hopper inlet, to an open position away from said portion of the hopper inlet.

14. A combination according to claim 1 including a foot mounted on the grain accumulator adjacent the bottom end of the grain accumulator for supporting the grain accumulator.

15. A combination in accordance with claim 14 wherein the grain accumulator includes a second foot adjacent a top end of the grain accumulator for supporting the top end of the grain accumulator.

* * * * *